(12) United States Patent
Choate

(10) Patent No.: US 6,718,601 B1
(45) Date of Patent: Apr. 13, 2004

(54) TIE BACK SNAP

(76) Inventor: Gary E. Choate, 1675 Carr St., #101N, Lakewood, CO (US) 80215

( * ) Notice: Subject to any disclaimer, the term of this patent is extended or adjusted under 35 U.S.C. 154(b) by 0 days.

(21) Appl. No.: 10/227,217

(22) Filed: Aug. 22, 2002

Related U.S. Application Data

(60) Provisional application No. 60/314,405, filed on Aug. 23, 2001.

(51) Int. Cl.[7] .................................................. F16B 45/02
(52) U.S. Cl. ...................................... 24/600.2; 24/599.5
(58) Field of Search ............................ 24/598.7, 599.1, 24/599.5, 599.9, 600.2, 265 AL; 294/82.2

(56) References Cited

U.S. PATENT DOCUMENTS

| | | | |
|---|---|---|---|
| 1,879,168 A | | 9/1932 | Freysinger |
| 1,985,596 A | * | 12/1934 | Burnham .................. 294/82.2 |
| 2,490,931 A | | 12/1949 | Thompson |
| 4,062,092 A | * | 12/1977 | Tamada et al. ............. 24/599.4 |
| 4,122,585 A | * | 10/1978 | Sharp et al. ............... 294/82.2 |
| 5,579,564 A | * | 12/1996 | Rullo et al. ................ 24/599.5 |
| 5,896,630 A | | 4/1999 | Smith et al. |
| 6,161,264 A | * | 12/2000 | Choate ...................... 24/599.5 |
| 6,283,524 B1 | * | 9/2001 | Simond ...................... 264/82.2 |
| 6,363,589 B1 | | 4/2002 | Calloway et al. |

* cited by examiner

*Primary Examiner*—Robert John Sandy
(74) *Attorney, Agent, or Firm*—Ramon L. Pizarro; Edwin H. Crabtree

(57) ABSTRACT

A snap hook having a J-shaped body, a gate that is pivotable about a pivot point that is near the first end of the shank, and a movable locking pin located near the second end of the shank. The locking pin is moved by least one parallel bar that is generally parallel to the shank and extends along the shank. Connected to the locking pin is a movable thumb grip that when moved urges the parallel bar to move the locking pin. The locking gate further having a recessed portion positioned near the second end of the shank and a closure portion positioned near the nose of the hook body, the closure portion and the recessed portion being at about the same distance from the pivot point, the recessed portion being adapted to cooperate with the locking pin so that when the locking pin is moved by the parallel bar the gate is released so that the gate can pivot about the pivot point.

9 Claims, 5 Drawing Sheets

TIE BACK LANYARD
TYPE I

TIE BACK LANYARD
TYPE II

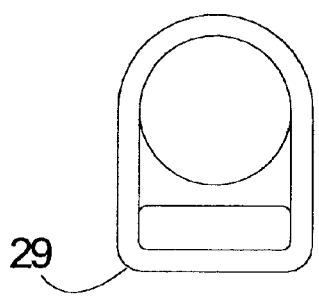
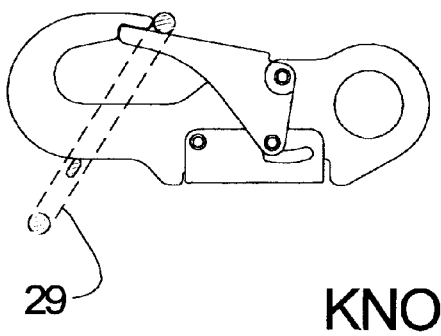
Fig. 5A                KNOWN ART
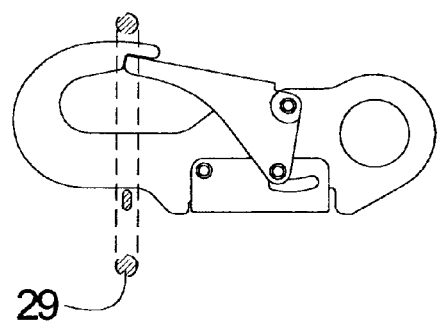
Fig. 5B                KNOWN ART
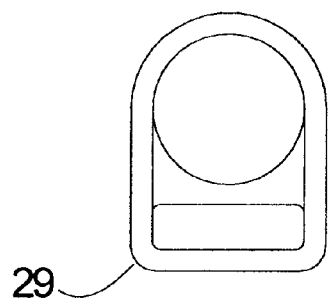
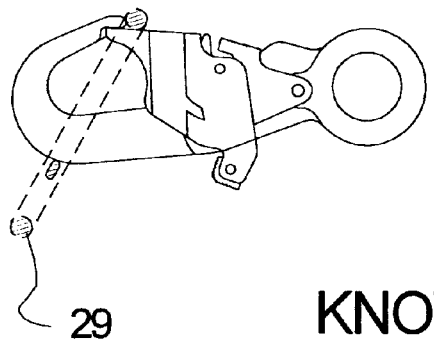
Fig. 5C                KNOWN ART
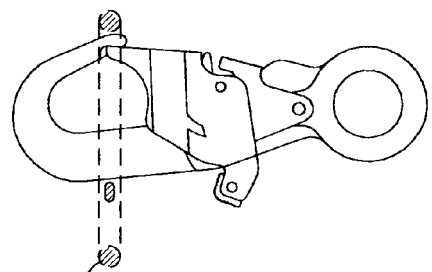
Fig. 5D                KNOWN ART

TIE BACK SNAP

REFERENCE TO RELATED APPLICATIONS

This application claims the benefit of my provisional application having Ser. No. 60/314,405, filed Aug. 23, 2001, now abandoned.

BACKGROUND OF THE INVENTION (a) Field of the Invention

This invention generally relates to a safety hook and attachment system for connecting the safety hook to a harness.

More particularly, but not by way of limitation, to a hook with a gate that prevents unwanted release of the hook and allows the gate to cooperate with the hook in a synergistic manner.

(b) Discussion of Known Art

There is a large variety of safety hooks or "tie back" snap hooks that are designed for use as safety equipment. These hooks typically include a J-shaped hook portion that includes a gate that closes the mouth of the hook in order to prevent the inadvertent release of the hook.

The primary purpose of these hooks is to tether a worker to a support structure in order to prevent an unrestrained fall to the ground. The safety hooks are typically used as part of a lanyard that includes a shock absorber or dampening mechanism. One end of the lanyard is attached by way of a safety hook to the back of a harness, while the other end of the lanyard is attached to some sort of support structure, such as a crane, a section of steel or rebar, or other attachment point specifically provided for restraining a fall.

Because of the variety of attachment points and work condition present during an instance where the safety hook and fall arrest systems must be deployed, the actual fall path and restrain conditions are rather unpredictable. Thus, the loading on a safety hook can vary depending on what occurs during the fall. For example, some fall conditions can cause the entire load from the fall to be reacted on the gate of the hook, which is typically the weakest portion of the hook. In order to ensure that the gate does not fail, safety hooks must have gates that are capable of resisting the loads from the fall without opening into or out of the mouth of the hook.

Thus, the safety hooks, also referred to as tie back snap hooks, are frequently used in personal fall protection applications where anchorage connectors are not readily available. A tie back snap enables a worker to loop the lanyard that is connected to the snap around a pipe or beam and then snap it back onto itself. This enables the worker to use items such as pipes in a pipe rack or I-beams and other structures in building steel as anchorage tie off points where no other types of anchorage connections exists. Currently tie back applications are performed in two ways. In the first a D-ring is attached to the lanyard with a slip buckle that is positioned halfway between the snap end and the shock absorber end of the lanyard. The worker can then loop the lanyard over a pipe or beam and connect the snap into the D-ring. The D-ring location is then adjusted to provide a snug fit around the pipe or beam. With this application a standard double action single locking snap can be used to create a tie back application. In the second application the lanyard is looped over the pipe or beam and then the snap is connected or snapped back around the lanyard itself This type of application has several inherent problems.

The first problem is that the lanyard webbing can lie across the inside of the snap gate. In a fall arrest the lanyard tension could put as much as 5000-lb. of load on the snap gate. Standard snap gates are designed according to OSHA regulation to withstand only a 350-lb. load. Therefore standard, double action, single locking snaps will not work for this type of application. Another danger with the use of snap hooks is that a snap, when looped over an I-beam with the edge of the gate against the flange of the I-beam, can fail by forces on the gate which can open by the due to the action of the I-beam pressing against the gate during fall arrest. For these reasons tie back snaps must be designed so that the gate will take a 5000-lb. load without failure in any direction, not the 350-lb. load typical in standard locking snap hooks. Some manufacturers have designed snap hooks that meet these requirements. Typically these snaps are much larger, must have forged rather than stamped steel gates, and must use much larger and stronger hinge pins. All of which adds greatly to the cost and weight of the product.

SUMMARY

It has been discovered that the problems left unanswered by known art can be solved by providing a snap-hook comprising:

A J-shaped body having a shank portion that includes a first end and a second end, the body further having a concave portion and a nose, the concave portion extending from the second end of the shank and terminating in the nose;

A gate that is pivotable about a pivot point that is near the first end of the shank;

A movable locking pin located near the second end of the shank;

At least one parallel bar that is generally parallel to the shank and extends along the shank;

A movable thumb grip that when moved urges the parallel bar to move the locking pin;

The locking gate further having a recessed portion positioned near the second end of the shank and a closure portion positioned near the nose of the hook body, the closure portion and the recessed portion being at about the same distance from the pivot point, the recessed portion being adapted to cooperate with the locking pin so that when the locking pin is moved by the parallel bar the gate is released so that the gate can pivot about the pivot point.

The present invention relates to an improved method of constructing a tie back snap for fall arrest applications that can be produced using existing manufacturing technology, can be made light weight, can be produced with a stamped steel gate, can be produced so that it can be snapped directly to its' own. lanyard webbing without the possibility of the webbing being able to slip behind the gate to cause failure under load and can be produced at a cost no higher than existing standard locking snap hooks.

The present invention relates to a new and unique method of designing a locking anchorage snap so that it can be tied (or snapped) back onto its own lanyard in a manner that will not damage or cut the lanyard nor cause damage to the snap itself. Additionally, this patent relates to a method to lock and unlock the snap gate so that it reduces the applied gate loads. Additionally, this patent relates to a new and unique method of designing a snap gate so that it is impossible for the lanyard to apply outward forces to the tie back snap gate when the snap is connected back to its own lanyard. Additionally, this patent applies to a method used to prevent rollout (accidental disengagement) of the locking snap.

The method comprises:

a. A forged steel snaphook body
b. A stamped or formed steel locking gate
c. A stamped or formed steel gate lock
d. A protrusion in the forged hook body between the gate and thumb grip to prevent rollout
e. A thumb grip to release the gate lock
f. A locking pin to lock the gate under load
g. A flat widened portion of the forged snap hook body to relieve and distribute tension in the webbing during fall arrest.
h. A method to arrange the geometry and shape of the gate so that it is impossible for the webbing to be positioned behind the gate when the gate is closed.
l. A method to soften the edge of the snap to prevent damage to the webbing while moving through the snap.
j. A method in the engagement between the locking pin and the gate so that the gate cannot be unlocked while being loaded
k. A method to arrange the geometry between the gate and the locking pin so that the required locking force is always less than the load applied to the gate during fall arrest.

In another aspect this invention relates to the locking method of the tie back snaphook. This unique locking method required 2 separate and distinct motions to unlock the gate. First the thumb grip on the top of the snaphook must be rotated with the thumb in a backward motion towards the eye of the snaphook. This moves the locking pin at the front of the gate forward releasing the pin from its engagement with the gate. Next the index finger is used to pull on the gate grip to rotate it backwards also towards the eye of the snap hook. This opens the gate allowing the webbing to pass through to the inside of the snap. Releasing the thumb grip and the gate grip simultaneously allows the gate to rotate under spring load back to its' closed position. Once in the closed position the thumb grip will rotate back under spring pressure until the locking pin is positioned firmly under the gate locking it into position.

It should also be understood that while the above and other advantages and results of the present invention will become apparent to those skilled in the art from the following detailed description and accompanying drawings, showing the contemplated novel construction, combinations and elements as herein described, and more particularly defined by the appended claims, it should be clearly understood that changes in the precise embodiments of the herein disclosed invention are meant to be included within the scope of the claims, except insofar as they may be precluded by the prior art.

DRAWINGS

The accompanying drawings illustrate preferred embodiments of the present invention according to the best mode presently devised for making and using the instant invention, and in which:

FIGS. 5A–5D are scale drawings illustrating the cooperation of a known snap hook with a D-ring used with a harness.

DETAILED DESCRIPTION OF PREFERRED EXEMPLAR EMBODIMENTS

While the invention will be described and disclosed here in connection with certain preferred embodiments, the description is not intended to limit the invention to the specific embodiments shown and described here, but rather the invention is intended to cover all alternative embodiments and modifications that fall within the spirit,and scope of the invention as defined by the claims included herein as well as any equivalents of the disclosed and claimed invention.

Figure 1:
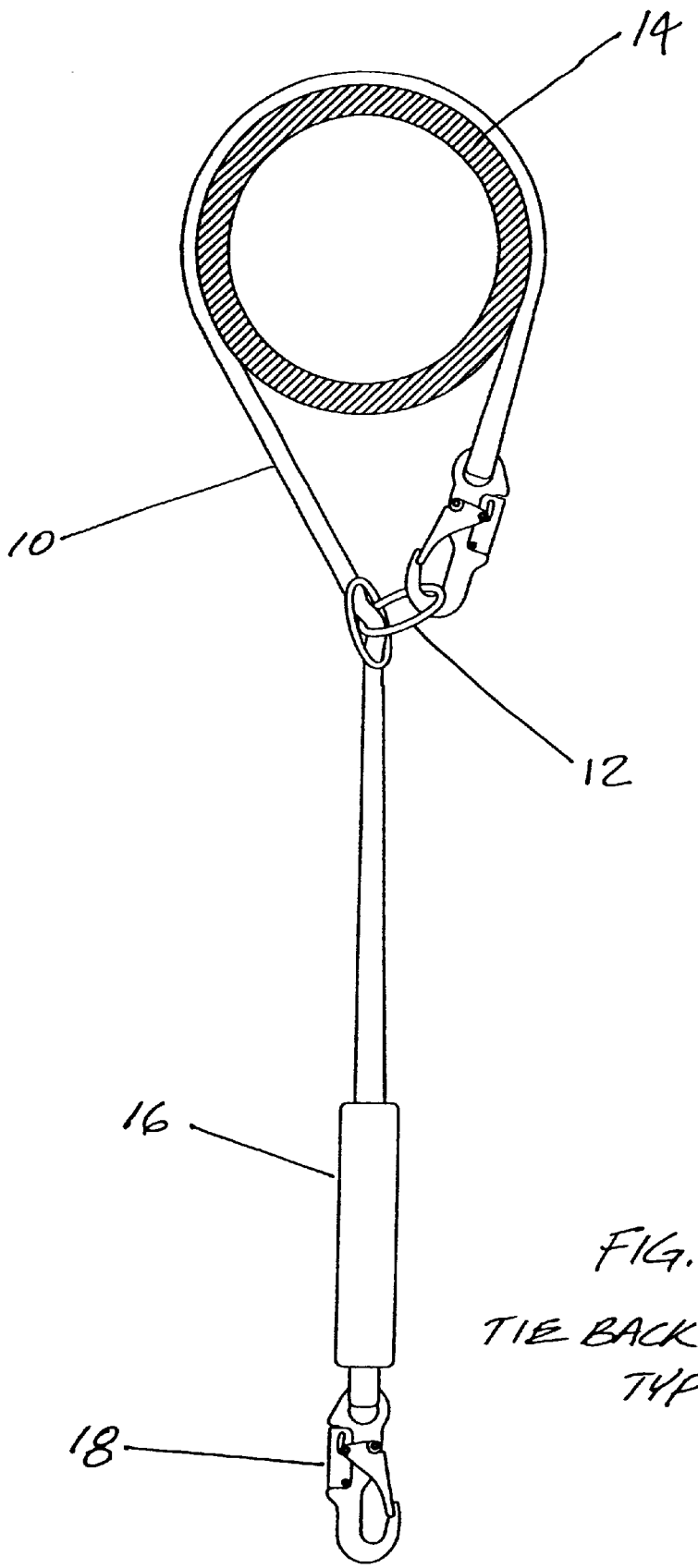
FIG. 1 is a detail of the tie back lanyard Type I.
Figure 2:
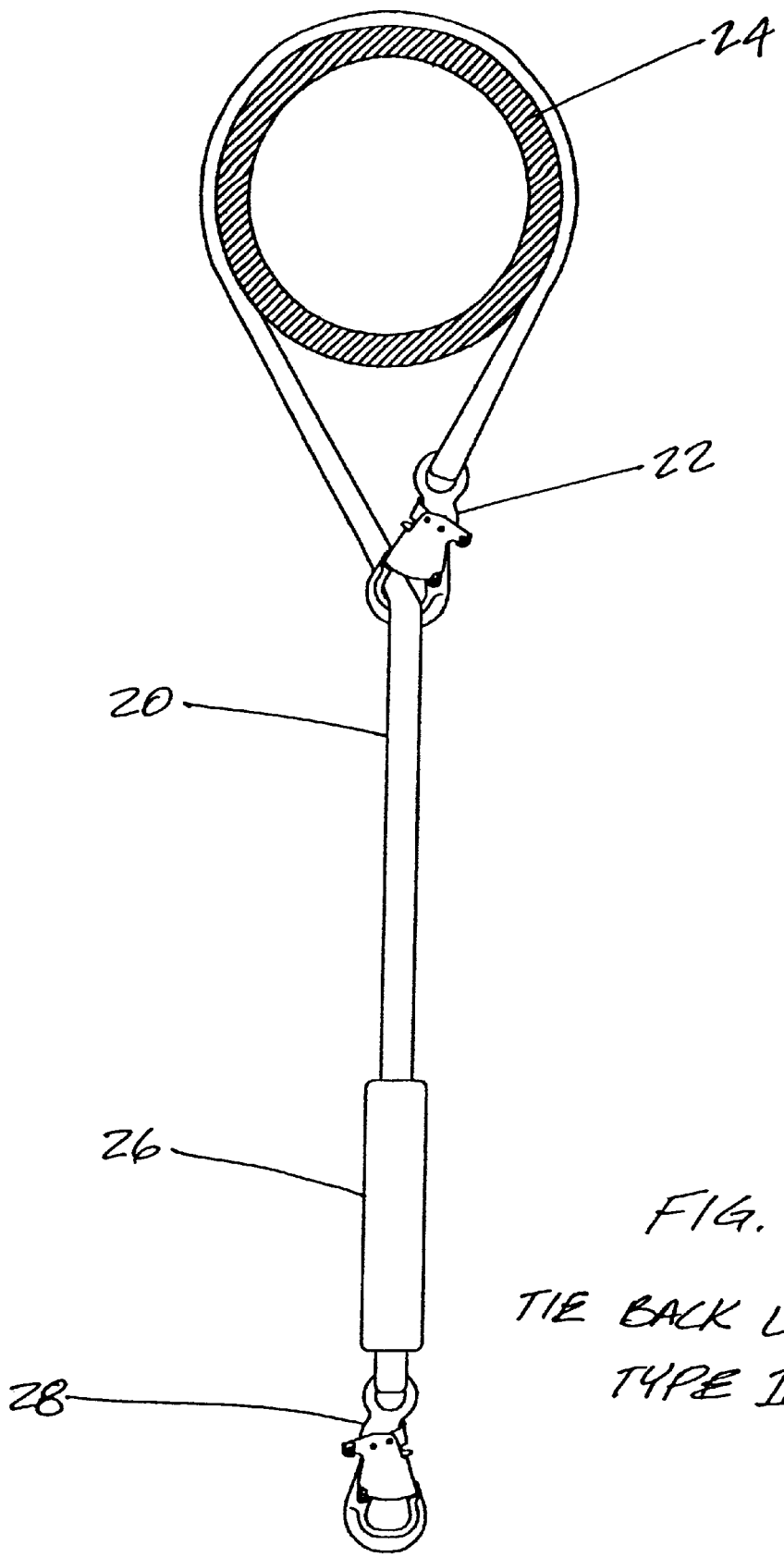
FIG. 2 is a detail of the tie back lanyard Type II.
Figure 3:
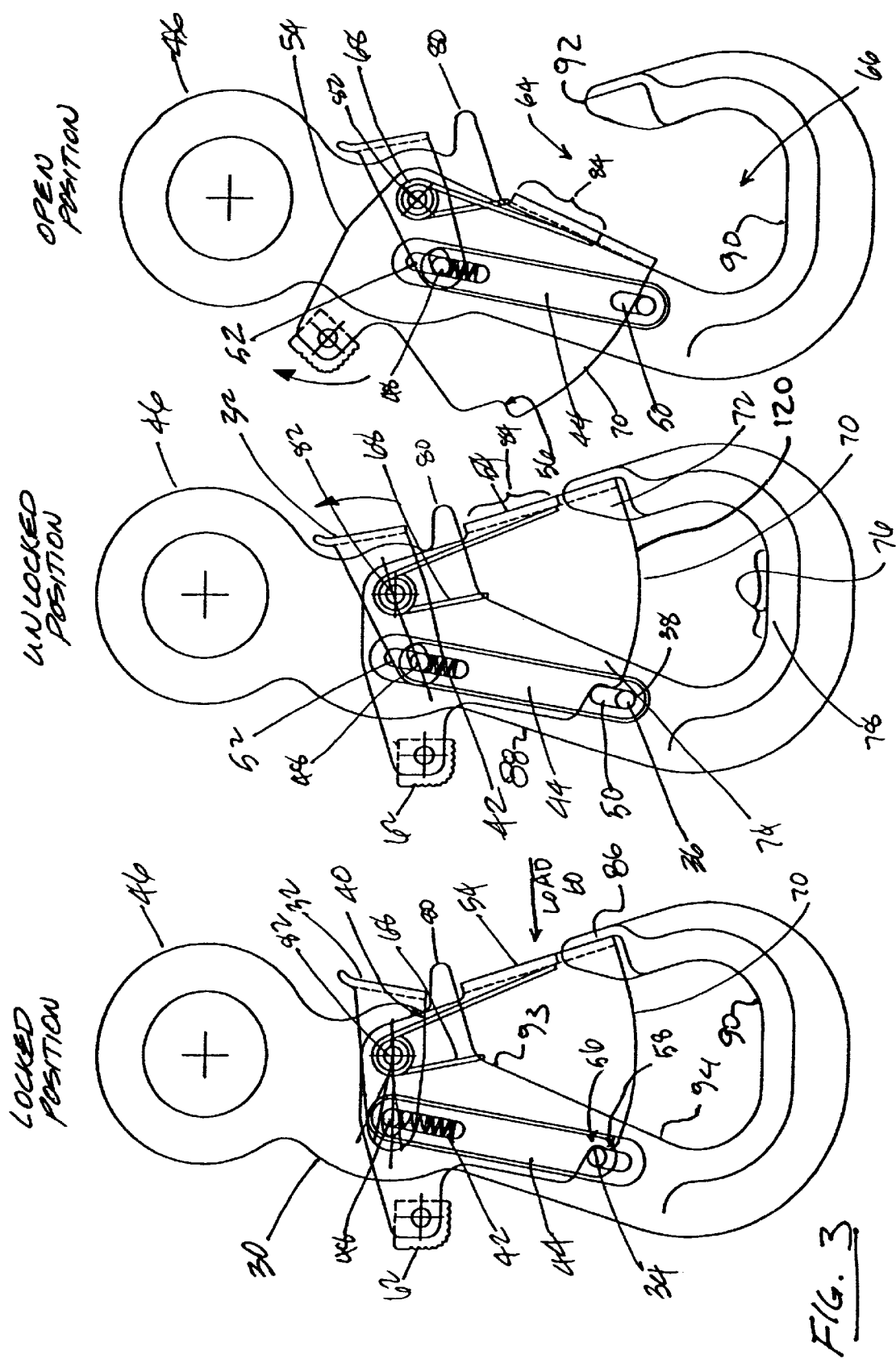
FIG. 3 is a drawing showing 3 views of the tie back snap in locked, unlocked, and open positions. The gate and parallel bar have been shown as transparent in order to illustrate the cooperation of the components.
Figure 4A:
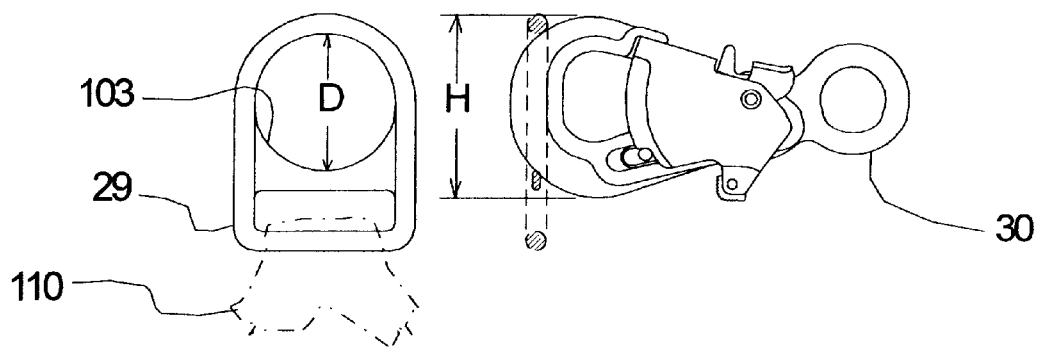
FIGS. 4A–4D are scale drawings illustrating the cooperation of the disclosed snap hook with a D-ring used with a harness.
Figure 4B:
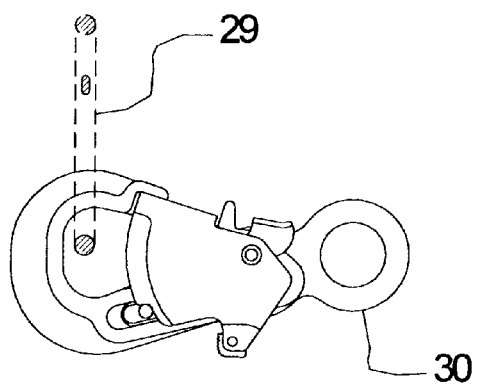
Figure 4C:
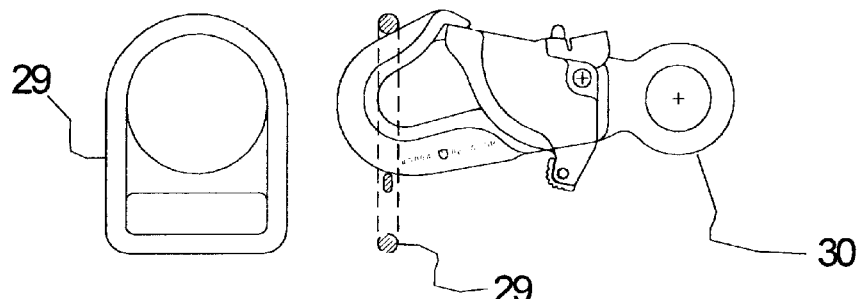
Figure 4D:
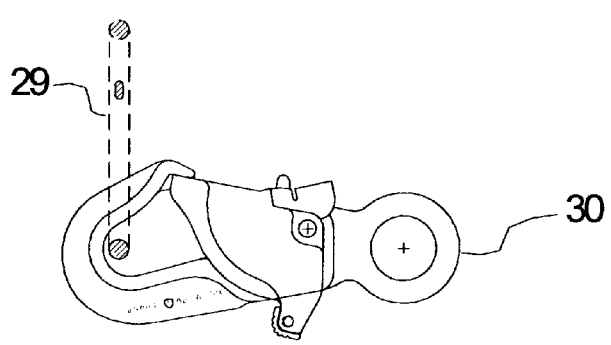

Turning now to FIGS. 1 through 3 illustrates the tie back snap geometry, use, and assembly according to the preferred embodiment of this invention. Referring to FIG. 1 the tie back lanyard Type 1(10) is shown attached to the tie back ring (12). The beam to which it is attached is a round pipe (14). The shock absorbing tie back lanyard (10) is shown with an integral shock absorber (16) and harness snap (18).

FIG. 2 shows the tie back lanyard Type II (20) with an integral tie back snap (22) positioned around a round pipe (24). The shock absorbing tie back lanyard (20) is shown with an integral shock absorber (26) and harness snap (28).

Of the Type I and Type II tie back lanyards, the easiest to use is the Type II because it does not require adjustment of the D-ring (12) to accommodate the size of the beam (14) as is required in the Type I lanyards. The Type II lanyard (20) must then use the tie back snap (22) so that it can snap directly back to the lanyard webbing (20) without requiring the use of a D-ring.

FIG. 3 shows that the tie back snap (30) will include a shank (88), which includes a first end (93) and a second end (94), a concave portion (90), and a nose (92). In operation the tie back snap (30) in three positions. First is the locked position, second is the unlocked position with the thumb grip (32) rotated to release the gate lock (34) by pushing the gate lock pin (36) to the open position (38). The thumb grip (32) is held in a normally closed position (40) by the thumb grip return spring (42). The thumb grip (32) is connected to the locking pin (36) by parallel bars (44) that are located on each side of the snap hook body (46). The parallel bars (44) are connected through the hook body (46) using pins (36 and 48) that are press fit to hold the parallel bars (44) in position and cause them to move parallel to each other as the pins (36 and 48) slide in their respective slots (50 and 52).

Thus, it is important to note that the illustrated tie back snap hook (30) includes a rounded inner edge 120 that prevents straps or other webbing materials from pressing directly against the gate (54). This rounded edge between the recess (56) and the closure portion (86) of the gate is centered about the pivot point (82) and performs two functions. One function is to prevent webbing from loading the gate, and the other is to act as a cam that allows the pin (48) to keep the parallel bars (44) slid on to the unlocked position while the gate (54) is being opened.

The gate (54) of the snap is made to lock against the locking pin (36) at the gate lock (34). A recess (56) in the gate (54) prevents the gate (54) from being able to be unlocked when in the closed position. The recess (56) is adjacent to a raised portion (58) which locks into the locking pin (36) when the gate is under load (60) preventing the thumb grip (32) from being able to pull the locking pin (36) out of the locked position (34).

When the thumb grip (32) has been pulled back to push the locking pin (36) forward out of the locked position (34) the gate grip (62) can then be pulled back allowing the gate (54) to open moving the closure portion (86) of the gate (54), exposing the entrance area (64). This allows webbing to pass through into the snap enclosure area (66). Once the webbing is in the snap enclosure area (66) the thumb grip (32) and gate grip (62) can be released simultaneously allowing the gate (54) to close and lock. The gate (54) is returned to its' closed position by the gate spring (68). Once the gate (54) is closed the webbing (20) is prevented from being able to position behind the gate (54) by the gate edge (70), which passes all the way across the snap enclosure area (66). This prevents the webbing (20) from being able to load the gate (54) in an outward position during fall arrest. The gate (54) is also supported on both sides of the hook body (46) in areas (72 and 74). This adds greatly to the side load strength of the gate (54).

The hook body (46) is formed with a wide flat area (76) using large rounded edges (78) to provide a smooth strong edge to support the webbing (20) when it is in the snap enclosure area (66) and the gate (54) is closed. Rollout potential on the tie back snap (22) is reduced by the use of a forged safety bar (80) that protrudes between the thumb grip (32) and the gate (54). This protrusion works effectively with the hook forging area (76) to prevent a D-ring from being able to press against the gate (54) when the thumb grip (32) has been rotated to the open position thereby unlocking the gate (54) by rotating the gate about the pivot point 82. The safety of this tie back snap (20) comes from the fact that the lock is double action requiring two separate and distinct motions to unlock and open it, and from the fact that the gate (54) is constructed in such a way that it crosses the hook body when closed, effectively preventing webbing from being able to position behind it. This means that the gate cannot be loaded in an outward position during fall arrest. The gate locking pin (36) is located a farther distance from the gate hinge pin than the gate face (84) thus making the load on the locking pin (36) less than the force on the gate face (84) during a fall arrest in which the gate (54) may be loaded against a beam flange.

According to yet another aspect of the invention, which has been illustrated in FIGS. 4A–4D and FIGS. 5A–5D, it is contemplated that the tie back snap 30 or safety hook as described herein cooperates with the D-ring 30 of a harness 100 to prevent inadvertent false engagement of the safety hook and the D-ring of the safety harness. The D-ring of the safety harness is typically positioned on the back of the harness, such that it will be at a location between the shoulder blades on the upper portion of the wearer's back. The problem of false engagement is illustrated in FIGS. 5A–5D, where scaled drawings of known snap hooks are shown inserted into the aperture 102 in the D-ring. Because the entire body of the snap hook fits into the aperture 103, and because the D-ring is on the wearers back where it cannot be seen by the wearer, it is possible for the snap hook to appear that it is properly engaged with the D-ring when in fact it is not. The proportions of the known snap hooks allow the entire body of the snap hooks to enter the aperture 103. The nose 105 of these hooks or other protrusion can temporarily catch on the D-ring, giving the wearer the impression that the hook has properly engaged the D-ring.

FIGS. 4A–4D illustrate that the disclosed invention 30 has been sized to have a body that is of a size H, which is larger than the diameter D of the aperture 103, making a false connection with the D-ring impossible. Thus, another aspect of the disclosed invention is a system that uses a D-ring 29 attached to the back of a harness 110. The hook 30 may be attached to a lanyard, preferably next to a shock absorber on the lanyard. Thus the use of the snap hook 30 with the lanyard and the harness would prevent false engagement of the safety hook with the D-ring of the harness 110.

Thus it can be appreciated that the above described embodiments are illustrative of just a few of the numerous variations of arrangements of the disclosed elements used to carry out the disclosed invention. Moreover, while the invention has been particularly shown, described and illustrated in detail with reference to preferred embodiments and modifications thereof, it should be understood that the foregoing and other modifications are exemplary only, and that equivalent changes in form and detail may be made without departing from the true spirit and scope of the invention as claimed, except as precluded by the prior art.

What is claimed is:

1. A snap hook comprising:

a J-shaped body having a shank portion that includes a first end and a second end, the body further having a concave portion and a nose, the concave portion extending from the second end of the shank and terminating in the nose;

a gate that is pivotable about a pivot point that is near the first end of the shank;

a movable locking pin located near the second end of the shank;

at least one parallel bar that is generally parallel to the shank and extends along the shank;

a movable thumb grip that when moved urges the parallel bar to move the locking pin;

the locking gate further having a recessed portion positioned near the second end of the shank and a closure portion positioned near the nose of the hook body, the closure portion and the recessed portion being at about the same distance from the pivot point, the recessed portion being adapted to cooperate with the locking pin so that when the locking pin is moved by the parallel bar the gate is released so that the gate can pivot about the pivot point.

2. A snap hook according to claim 1 wherein said locking pin is mounted on the hook body.

3. A snap hook according to claim 1 wherein said locking pin is mounted on the parallel bar.

4. A snap hook according to claim 1 wherein said gate extends to at least beyond said locking pin and said nose, away from the pivot point.

5. A snap hook comprising:

J-shaped body having a shank portion that includes a first end and a second end, the body further having a concave portion and a nose, the concave portion extending from the second end of the shank and terminating in the nose;

a gate that is pivotable about a pivot point that is near the first end of the shank;

a movable locking pin located near the second end of the shank;

a pair of parallel bars that are generally parallel to the shank and extends on opposite side of the shank along the shank;

a movable thumb grip that when moved urges the parallel bar to move the locking pin;

the locking gate further having a recessed portion positioned near the second end of the shank and a closure portion positioned near the nose of the hook body, the closure portion and the recessed portion being at about the same distance from the pivot point, the recessed portion being adapted to cooperate with the locking pin so that when the locking pin is moved by the parallel bar the gate is released so that the gate can pivot about the pivot point.

6. A snap hook according to claim 5 wherein said locking pin is mounted on the hook body.

7. A snap hook according to claim 5 wherein said locking pin is mounted on the parallel bar.

8. A snap hook according to claim 6 wherein said gate extends to at least beyond said locking pin and said nose, away from the pivot point.

9. A method for preventing false engagement of a snap hook with a D-ring on the back of a safety harness, the D-ring having an aperture of a diameter of a length D, the method comprising:

providing a snap hook comprising:
    a J-shaped body having a shank portion that includes a first end and a second end, the body further having a concave portion and a nose, the concave portion extending from the second end of the shank and terminating in the nose, the concave portion having an external dimension H that is larger than the length D;
    a gate that is pivotable about a pivot point that is near the first end of the shank; and
  Attaching the snap hook to a lanyard, so that the entire body of the snap hook cannot fit through the aperture of the D-ring.

* * * * *